US 12,429,160 B2

(12) United States Patent
Choi et al.

(10) Patent No.: US 12,429,160 B2
(45) Date of Patent: Sep. 30, 2025

(54) ASSEMBLY FOR MOUNTING ELECTRONIC DEVICE

(71) Applicant: HANWHA VISION CO., LTD., Seongnam-si (KR)

(72) Inventors: Eun Soo Choi, Seongnam-Si (KR); Chang Wook Park, Seongnam-Si (KR); Jong Man Jin, Seongnam-Si (KR)

(73) Assignee: HANWHA VISION CO., LTD., Seongnam-si (KR)

( * ) Notice: Subject to any disclaimer, the term of this patent is extended or adjusted under 35 U.S.C. 154(b) by 35 days.

(21) Appl. No.: 18/390,957

(22) Filed: Dec. 20, 2023

(65) Prior Publication Data
US 2024/0117920 A1    Apr. 11, 2024

Related U.S. Application Data

(63) Continuation of application No. PCT/KR2022/009928, filed on Jul. 8, 2022.

(30) Foreign Application Priority Data

Jul. 8, 2021    (KR) ........................ 10-2021-0089724

(51) Int. Cl.
*F16M 11/14*    (2006.01)
*G03B 17/56*    (2021.01)

(52) U.S. Cl.
CPC ........... *F16M 11/14* (2013.01); *G03B 17/561* (2013.01)

(58) Field of Classification Search
CPC . F16M 11/14; F16M 2200/022; G03B 17/561
See application file for complete search history.

(56) References Cited

U.S. PATENT DOCUMENTS

| 6,173,936 B1 * | 1/2001 | Hegarty | ................. F16M 11/14 248/442.2 |
| 8,534,951 B2 * | 9/2013 | Komine | ............... G01B 5/0002 403/56 |

(Continued)

FOREIGN PATENT DOCUMENTS

| EP | 3 492 058 A1 | 6/2019 |
| GB | 688685 A | 3/1953 |

(Continued)

OTHER PUBLICATIONS

International Search Report (PCT/ISA/210) issued Oct. 17, 2022 by the International Searching Authority in International Patent Application No. PCT/KR2022/009928.

(Continued)

*Primary Examiner* — Bradley Duckworth
(74) *Attorney, Agent, or Firm* — Sughrue Mion, PLLC

(57) ABSTRACT

An assembly for mounting an electronic device, includes: a base, a mounting support for mounting the electronic device, and an arm connecting the base and the mounting support, wherein the arm includes: a front locker configured to be coupled to a joint of the mounting support; a rear locker configured to be coupled to the base; a pusher having a front inclined surface in contact with the front locker and a rear inclined surface in contact with the rear locker; and a housing accommodating the front locker, the rear locker, and the pusher.

18 Claims, 11 Drawing Sheets

(56) References Cited

U.S. PATENT DOCUMENTS

| | | | |
|---|---|---|---|
| 9,940,802 B2 * | 4/2018 | Rosenkvist | F16M 13/02 |
| 10,419,649 B2 * | 9/2019 | Gilbert | F16M 11/041 |
| 11,098,840 B2 * | 8/2021 | Ye | F16M 11/16 |
| 11,506,240 B2 * | 11/2022 | Josten | F16M 11/2014 |
| 11,519,590 B2 * | 12/2022 | Mai | F21V 21/084 |
| 11,713,844 B2 * | 8/2023 | Kuriyama | F16M 11/242 |
| | | | 248/371 |
| 2005/0001116 A1 * | 1/2005 | Vogt | F16C 11/106 |
| | | | 248/177.1 |
| 2016/0223886 A1 | 8/2016 | Bellerive et al. | |
| 2016/0334693 A1 | 11/2016 | Maltese et al. | |
| 2017/0276291 A1 | 9/2017 | Subratie et al. | |
| 2020/0275989 A1 * | 9/2020 | Sanchez Lopez | F16M 11/041 |

FOREIGN PATENT DOCUMENTS

| | | |
|---|---|---|
| KR | 10-2015-0058090 A | 5/2015 |
| KR | 10-2017-0131216 A | 11/2017 |
| KR | 10-2021-0022973 A | 3/2021 |

OTHER PUBLICATIONS

Written Opinion (PCT/ISA/237) issued Oct. 17, 2022 by the International Searching Authority in International Patent Application No. PCT/KR2022/009928.

Extended European Search Report dated May 16, 2025, issued by the European Patent Office in European Application No. 22838042.4.

* cited by examiner

100

54

ASSEMBLY FOR MOUNTING ELECTRONIC DEVICE

CROSS-REFERENCE TO RELATED APPLICATIONS

This application is a by-pass continuation application of International Application No. PCT/KR2022/009928, filed on Jul. 8, 2022, which is based on and claims priority to Korean Patent Application No. 10-2021-0089724, filed on Jul. 8, 2021, in the Korean Intellectual Property Office, the disclosures of which are incorporated by reference herein their entireties.

BACKGROUND

1. Field

The disclosure relates to an apparatus for releasing/fixing the direction of operation of an electronic device joint. More particularly, the disclosure relates to an assembly for mounting an electronic device, which is capable of fixing a structure located at 90 degrees to a screw when the screw is moved in a straight line in closed-circuit television (CCTV) cameras or similar electronic products, toys, etc. in which the direction of a camera needs to be adjusted.

2. Description of the Related Art

In a fixing technology of an apparatus for releasing/fixing the direction of operation of a camera joint, a screw is applied in each direction of movement for tilt, rotation, and panning. In the related art, another technology provides a configuration in which a rib pin protrudes from a member pulled by a screw and the rib pin is inserted and fixed between serration structures behind the rib pin.

In the related art, when a front spherical structure is fixed by tightening and loosening one screw, the fixing of the front spherical structure can be adjusted by bringing a surface friction portion (surrounding a ball joint) into a contact with the front spherical structure or by separating the surface friction portion from the front spherical structure. However, the full length of a product (having the front spherical structure) may be increased to apply the ball joint. Therefore, in order to reduce the length of the product while fixing a rear structure, a flat structure may be inserted, which uses a method of inserting a rib between serrations.

However, these related arts have several drawbacks. First, if the movement direction of the rib is the same as the movement direction of the screw, the rib and the screw may interfere with each other without being positioned at their initial coupling positions. In addition, if the rib is made thin to facilitate a smooth insertion into a gap, there is a risk of damaging the rib. Furthermore, since it is difficult to make the serrations small, the resolution for a rotation angle decreases.

SUMMARY

The disclosure is directed to methods and systems to solve the foregoing problems of the related art. Provided is an assembly for mounting an electronic device, in which when one screw is tightened, a rib turns backward by 90 degrees to enter between serration structures of an object due to its inclination angle, thereby eliminating interference during insertion into a gap.

Provided is a system and a method for preventing a reduction in fixing force by suppressing a yawing motion that occurs in related parts when a camera joint is fixed. Provided is a sufficient fixing force to the electronics mounting assembly by surrounding a ball joint with an elastic material. However, aspects of the disclosure are not restricted to the one set forth herein. The above and other aspects of the disclosure will become more apparent to one of ordinary skill in the art to which the disclosure pertains by referencing the detailed description of the disclosure given below.

According to an aspect of the disclosure, an assembly for mounting an electronic device, includes: a base, a mounting support for mounting the electronic device, and an arm connecting the base and the mounting support, wherein the arm includes: a front locker configured to be coupled to a joint of the mounting support; a rear locker configured to be coupled to the base; a pusher having a front inclined surface in contact with the front locker and a rear inclined surface in contact with the rear locker; and a housing accommodating the front locker, the rear locker, and the pusher, wherein the front inclined surface is inclined closer to the mounting support toward the bottom, wherein the rear inclined surface is inclined closer to the base toward the bottom, wherein the front locker has an inclined surface corresponding to the front inclined surface, and wherein the rear locker has an inclined surface corresponding to the rear inclined surface.

In an embodiment, a screw fastening hole is formed in a surface of the housing, wherein a tap member is formed in the pusher at a position close to the screw fastening hole, and wherein the arm further includes a screw for screwing the screw fastening hole and the tap member.

In an embodiment, the housing includes an upper housing formed in the screw fastening hole and a lower housing assembled with the upper housing.

In an embodiment, the pusher is configured to descend based on the screw rotated in a releasing direction, and wherein the pusher is configured to ascend based on the screw rotated in a fastening direction.

In an embodiment, wherein in a case that the pusher descends, a first axial force between the front inclined surface of the pusher and the inclined surface of the front locker and between the rear inclined surface of the pusher and the inclined surface of the rear locker is released to bring about a movable state in which the mounting support and the base is movable with respect to the arm, and wherein in a case that the pusher ascends, a second axial force acts between the front inclined surface of the pusher and the inclined surface of the front locker and between the rear inclined surface of the pusher and the inclined surface of the rear locker to bring about a fixed state in which the mounting support and the base are fixed to the arm.

In an embodiment, the mounting support includes: a ball joint surface contacting a first contact surface formed on an inner surface of the housing and a second contact surface formed on a portion of the front of the front locker; a neck portion extending forward from a ball joint and being held by an opening of the housing; and a mounting portion connected to the neck portion and configured to mount the electronic device.

In an embodiment, a surface mesh is formed on a ball surface of the ball joint by a knurling process.

In an embodiment, an injection-molded product made of a non-metallic material is coated and laid on the contact surfaces.

In an embodiment, a guide slot is formed on one side of the housing, wherein, in the movable state, a movement of the neck portion of the mounting support along the guide slot causes atilt motion of the mounting support, and a rotation of the ball joint about an axial direction of the arm causes a rotational motion of the mounting support, and wherein, in the movable state, the base has a rotational motion about the axial direction of the arm.

In an embodiment, the arm further includes a spring interposed between the rear locker and the base, and wherein the spring is configured to provide an elastic force in a direction to separate the rear locker and the base.

In an embodiment, the base includes: a flat member; a neck portion extending forward from the flat member and being held by an opening of the housing; a serration member having a plurality of teeth disposed in a circumferential direction at the front of the neck portion; and a through hole penetrating a center of the serration member.

In an embodiment, the rear locker includes a rib protruding from a rear surface of the rear locker toward the serration member, and wherein the rib is inserted between the teeth.

In an embodiment, both of the rib and the teeth have a tapered shape that becomes narrower in a direction in which the rib and the teeth protrude.

In an embodiment, a pitch interval between the teeth determines a resolution at which the base adjusts a position by rotating with respect to the arm.

In an embodiment, the rear surface of the rear locker includes: a first rim portion inserted into the through hole; a second rim portion concentrically disposed outside the first rim portion and guiding the rotation of the base with respect to the arm while surrounding the serration member together with the first rim portion; and a third rim portion concentrically disposed outside the second rim portion and forming a space for accommodating an end of the spring with the second rim portion.

In an embodiment, the front locker includes a guider coupled to a groove formed in the inner surface of the housing and guiding the movement of the front locker in the axial direction of the arm.

In an embodiment, the front locker further includes a foot portion formed at a position opposite the guider to protrude toward the pusher, wherein the housing includes a stopper formed on the inner surface to protrude in an inner diameter direction, and wherein, in a case that the front locker is pushed forward by the pusher being ascending, the foot portion and the stopper touch each other to suppress the front locker from yawing downward.

In an embodiment, at least one of the joint, the front locker, the pusher, the rear locker, and the base have a through hole extending along the axial direction of the arm.

According to an aspect of the disclosure, an assembly for mounting an electronic device, includes: a base, a mounting support for mounting the electronic device, and an arm connecting the base and the mounting support, wherein the arm includes: a front locker configured to be coupled to a joint of the mounting support; a rear locker configured to be coupled to the base; a pusher having a front inclined surface in contact with the front locker and a rear inclined surface in contact with the rear locker; and a housing accommodating the front locker, the rear locker, and the pusher, wherein the front inclined surface is inclined closer to the mounting support toward the bottom, wherein the rear inclined surface is inclined closer to the base toward the bottom, wherein the front locker has an inclined surface corresponding to the front inclined surface, and wherein the rear locker has an inclined surface corresponding to the rear inclined surface, wherein in a case that the pusher descends, an axial force between the front inclined surface of the pusher and the inclined surface of the front locker and between the rear inclined surface of the pusher and the inclined surface of the rear locker is released to bring about a movable state in which the mounting support and the base is movable with respect to the arm, and wherein in a case that the pusher ascends, an axial force acts between the front inclined surface of the pusher and the inclined surface of the front locker and between the rear inclined surface of the pusher and the inclined surface of the rear locker to bring about a fixed state in which the mounting support and the base are fixed to the arm.

According to the disclosure, an assembly for mounting an electronic device can reliably fix or release a camera joint without increasing the length of the electronic device. In addition, camera joints located at the front and back of a housing can be simultaneously fixed or released simply by manipulating screws.

However, the effects of the disclosure are not limited to the aforementioned effects, and various other effects are included in the present specification.

BRIEF DESCRIPTION OF DRAWINGS

The above and other aspects, features, and advantages of certain embodiments of the disclosure will be more apparent from the following description taken in conjunction with the accompanying drawings, in which.

DETAILED DESCRIPTION

Figure 1:
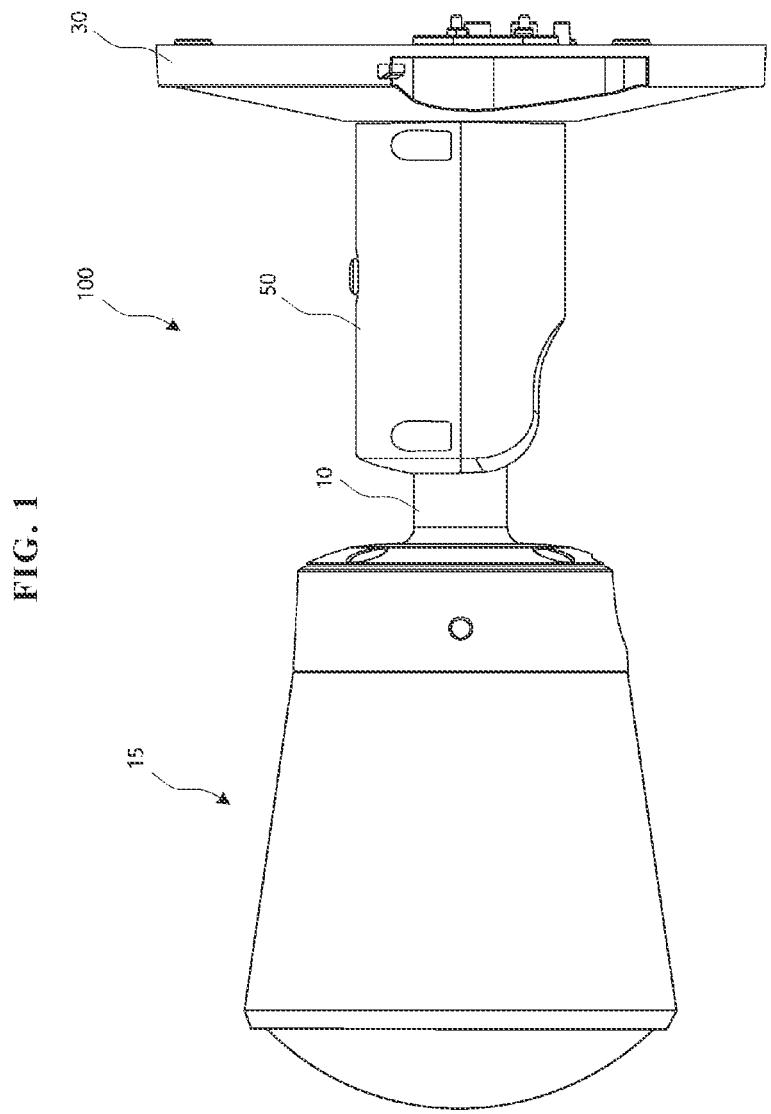
FIG. 1 is a side view illustrating an electronic device (a camera module) mounted in an assembly for mounting an electronic device according to an embodiment of the disclosure.

Advantages and features of the disclosure and methods to achieve them will become apparent from the descriptions of exemplary embodiments herein below with reference to the accompanying drawings. However, the disclosure is not limited to exemplary embodiments disclosed herein but may be implemented in various ways. The exemplary embodiments are provided for making the disclosure of the disclosure thorough and for fully conveying the scope of the disclosure to those skilled in the art. It is to be noted that the scope of the disclosure is defined only by the claims. Like reference numerals denote like elements throughout the descriptions.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

The term "couple" and the derivatives thereof refer to any direct or indirect communication between two or more elements, whether or not those elements are in physical contact with each other. The terms "transmit", "receive", and "communicate" as well as the derivatives thereof encompass both direct and indirect communication. The terms "include" and "comprise", and the derivatives thereof refer to inclusion without limitation. The term "or" is an inclusive term meaning "and/or". The phrase "associated with," as well as derivatives thereof, refer to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" refers to any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C, and any variations thereof. The expression "at least one of a, b, or c" may indicate only a, only b, only c, both a and b, both a and c, both b and c, all of a, b, and c, or variations thereof. Similarly, the term "set" means one or more. Accordingly, the set of items may be a single item or a collection of two or more items.

Further, expressions relating to directions such as forward, backward, upward, downward, and the like are used herein for ease of description but should be understood as relative concepts that may be defined differently depending on the installation orientation of the electronics mounting assembly of the disclosure.

Hereinafter, exemplary embodiments of the disclosure will be described in detail with reference to the accompanying drawings.

Figure 2:
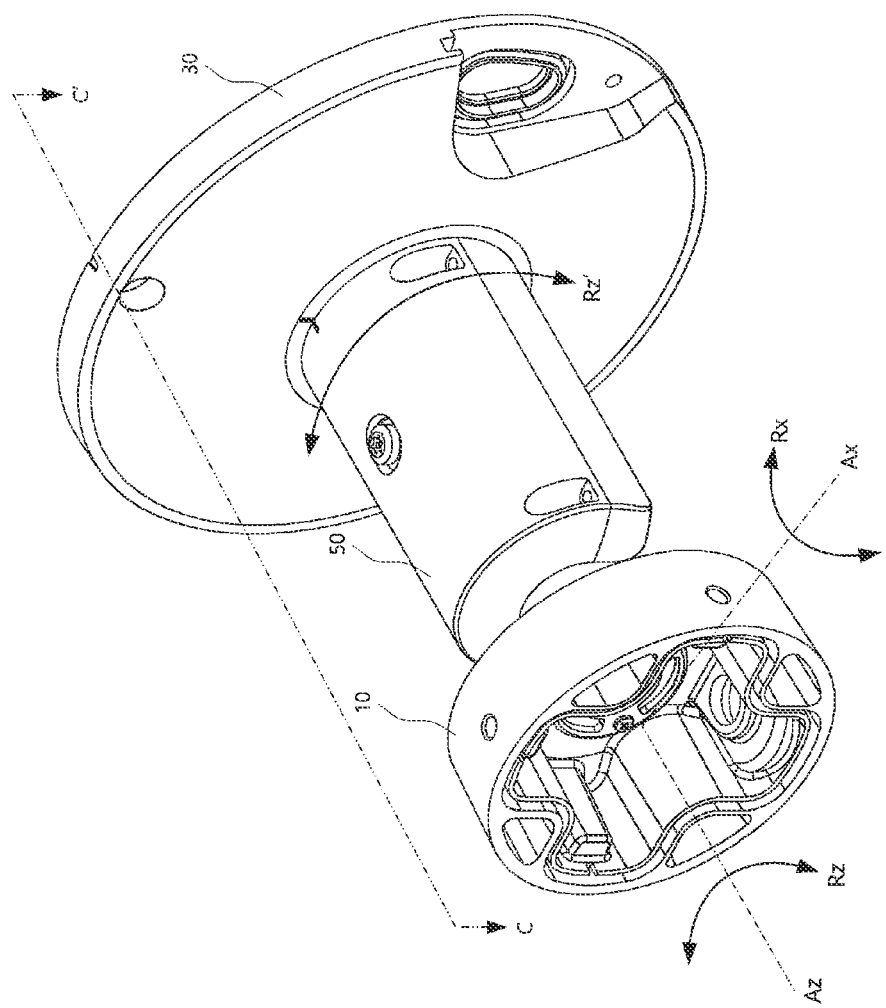
FIG. 2 is a perspective view of the electronics mounting assembly according to an embodiment of the disclosure.

FIG. 1 is a side view illustrating an electronic device 15 (a camera module) mounted as an example of an electronic device in an electronics mounting assembly 100 for mounting an electronic device according to an embodiment of the disclosure. FIG. 2 is a perspective view of the electronics mounting assembly 100 according to the embodiment of the disclosure.

As illustrated in FIG. 1, the electronics mounting assembly 100 may include a base 30, for example, installed on a fixed structure, a mounting support 10 for mounting an electronic device 15 (e.g., a camera module), and an arm 50 connecting the base 30 and the mounting support 10. Here, a fixed state in which the base 30 and the mounting support 10 are fixed to the arm 50 and a movable state in which they are movable are provided.

Although the camera module is illustrated as an example of the electronic device 15 in FIG. 1, the disclosure is not necessarily limited thereto and may also be applied to other electronic devices that are installed on a fixed structure and must be connected to a cable for power or communication.

Referring to FIG. 2, in the movable state, the mounting support 10 may have a tilt motion Rx in which the mounting support 10 may be tilted about a horizontal axis Ax with respect to the arm 50. In one embodiment, the mounting support 10 may have a rotational motion Rz caused by the rotation of a ball joint coupled to the arm 50 about an axial direction Az of the arm 50. On the other hand, in the movable state, the base 30 may only have a rotational motion Rz' about the axial direction Az of the arm 50 (when the base 30 is fixed on an installation surface, this motion may be the rotational motion Rz' of the arm 50). Through a combination of these motions Rx, Rz and Rz', the electronic device 15 may be installed in various positions and orientations desired by a user.

Figure 3:
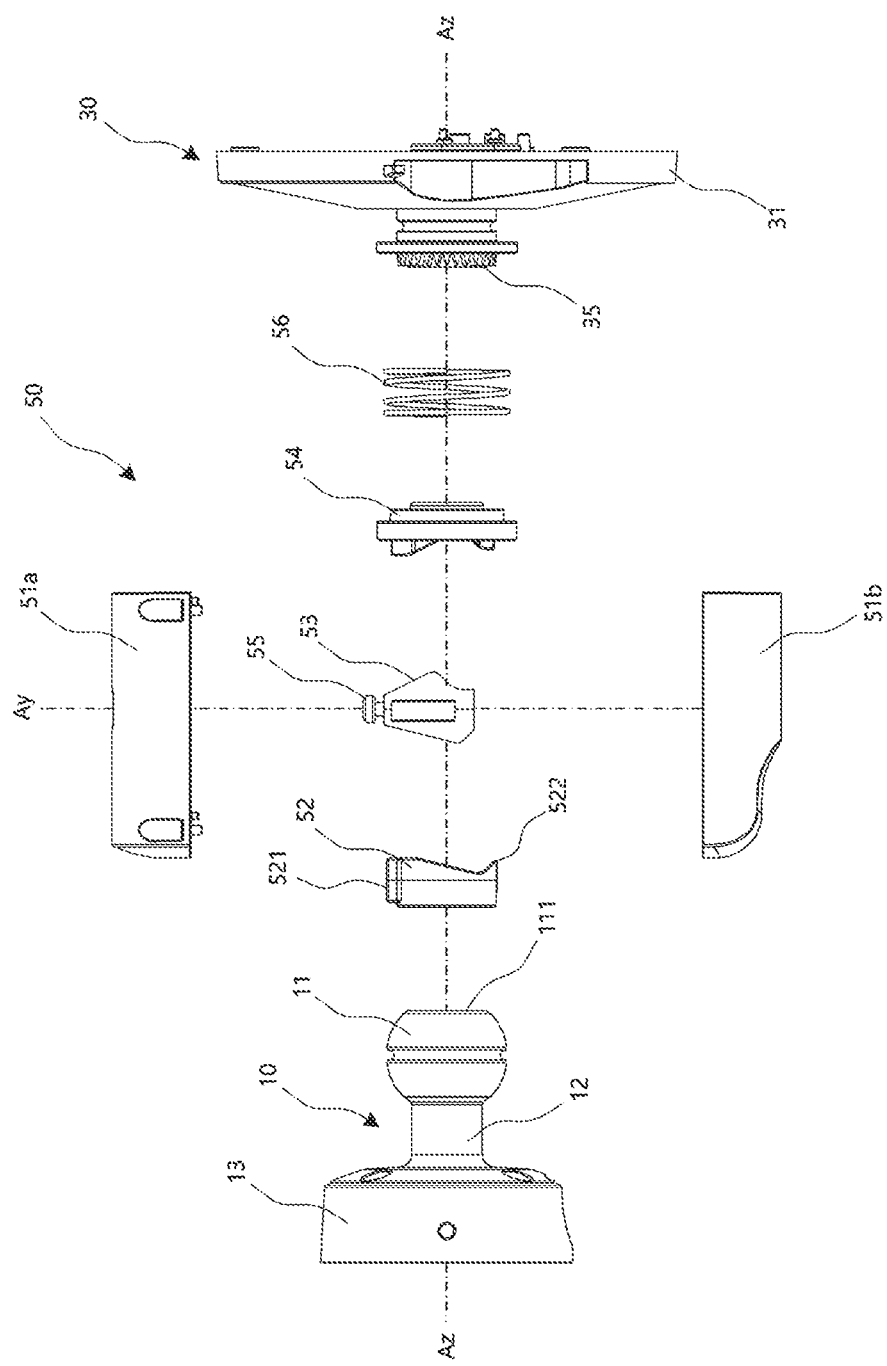
FIG. 3 is an exploded view of the electronics mounting assembly according to an embodiment of the disclosure.
Figure 4:
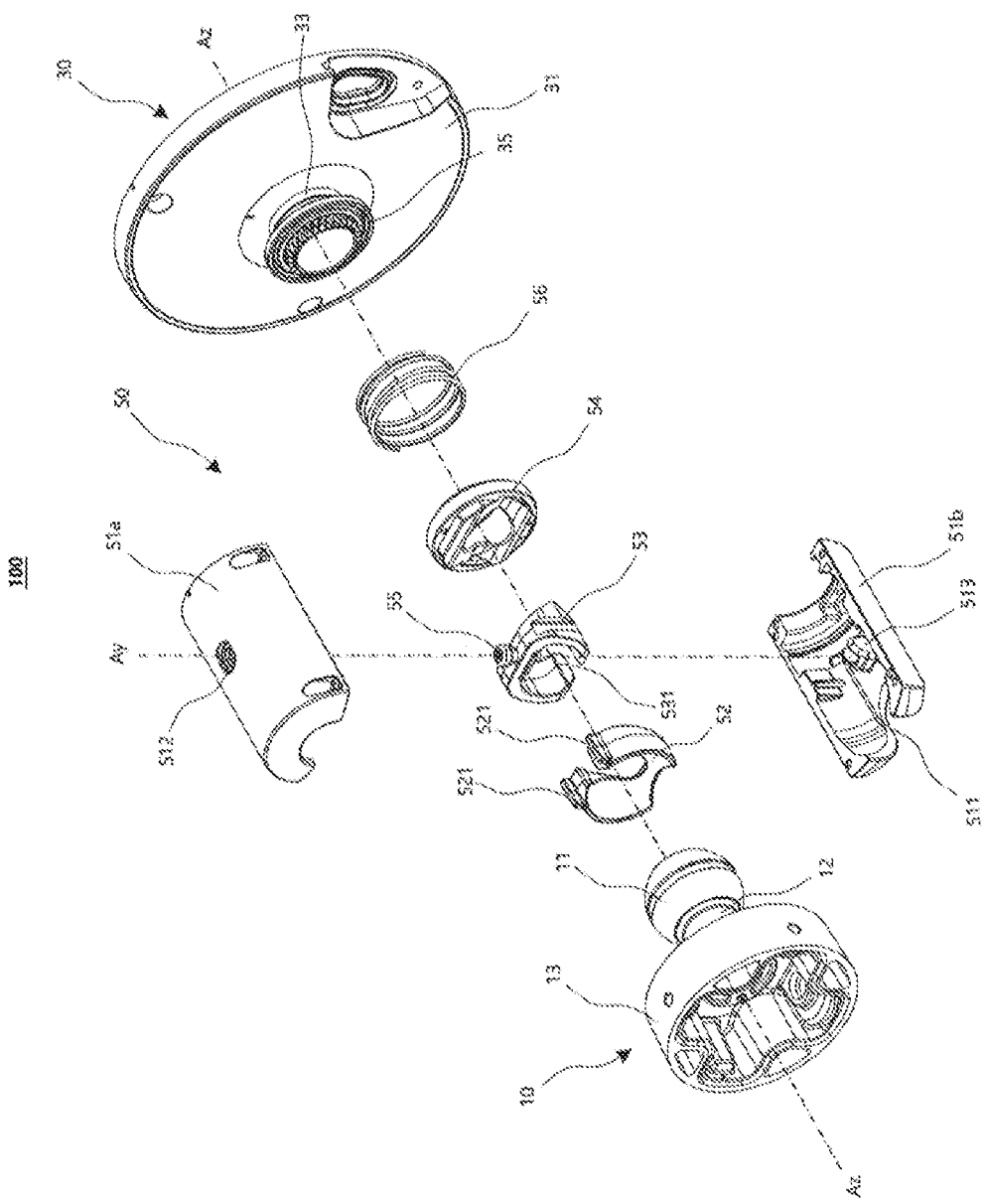
FIG. 4 is an exploded perspective view of FIG. 3 viewed from a different angle according to an embodiment of the disclosure.

FIG. 3 is an exploded view of the electronics mounting assembly 100 according to the embodiment of the disclosure. FIG. 4 is an exploded perspective view of FIG. 3 viewed from a different angle.

As illustrated in FIGS. 3 and 4, the mounting support 10 may include a ball joint 11, a neck portion 12, and a mounting portion 13.

The ball joint 11 allows the posture of the mounting support 10 to be changed by sliding on a first contact surface 515 (see FIGS. 6 and 7) formed on an inner surface of a housing 51 and a second contact surface 525 (see FIGS. 6 and 7) formed on a portion of the front of a front locker 52.

The neck portion 12 extends forward from the ball joint 11 and is held by a front opening of the housing 51 (an upper housing 51a and a lower housing 51b). The neck portion 12 may provide the tilt motion Rx (shown in FIG. 2) to the mounting support 10 while moving in a direction regulated by a guide slot 511 (shown in FIG. 4) formed on a lower side of the housing 51.

In one embodiment, the mounting portion 13 is connected to the neck portion 12 and is a component part for mounting the electronic device 15.

As illustrated in FIGS. 3 and 4, the arm 50 may include a plurality of parts. According to an embodiment of the disclosure, the arm 50 may include the front locker 52, a pusher 53, a rear locker 54, a screw 55, a spring 56, and the housing 51 for accommodating these component parts. The housing 51 may include the upper housing 51a having a screw fastening hole 512 and the lower housing 51b assembled with the upper housing 51a. In one embodiment, the housing 51 may accommodate the joint (e.g., the ball joint) 11 included in the mounting support 10 and a serration member 35 included in the base 30, in addition to the above component parts. To accommodate the joint 11 and the serration member 35, which may be parts of other components, the housing 51 may have openings formed at the front and back thereof, respectively.

The front locker 52 may be configured to be coupled to the ball joint 11 of the mounting support 10, and the rear locker 54 may be configured to be coupled to the base 30.

The pusher 53 has a front inclined surface a (see FIGS. 6 and 7) in contact with the front locker 52 and a rear inclined surface b (see FIGS. 6 and 7) in contact with the rear locker 54.

In one embodiment, the base 30 (having the serration member 35 that protrudes forward) is disposed behind the rear locker 54. The spring 56 may be interposed between the rear locker 54 and the base 30 to provide an elastic force in a direction (e.g., Az) to separate the rear locker 54 and the base 30.

Here, the motion Rx or Rz of the mounting support 10 with respect to the arm 50 is suppressed by the coupling of the front locker 52 and the ball joint 11, and the motion Rz' of the arm 50 with respect to the base 30 is suppressed by the coupling of the rear locker 54 and the serration member 35.

In a case that the electronic device 15 is installed at the front of the mounting support 10 and a rear surface of the base 30 is installed on an installation surface, a cable may need to be connected to the electronic device 15 by passing through the component parts along the axial direction Az of the arm 50 to provide power and communication functions to the electronic device 15. Therefore, as illustrated in FIG. 4, the disclosure is configured to secure a passage for connecting a cable from the base 30 to the electronic device 15 mounted on the mounting support 10. In an embodiment, all or some of the joint 11, the front locker 52, the pusher 53, the rear locker 54, and the base 30 include a through hole extending along the axial direction Az of the arm 50. In an embodiment, the spring 56 includes a through hole.

Figure 5:
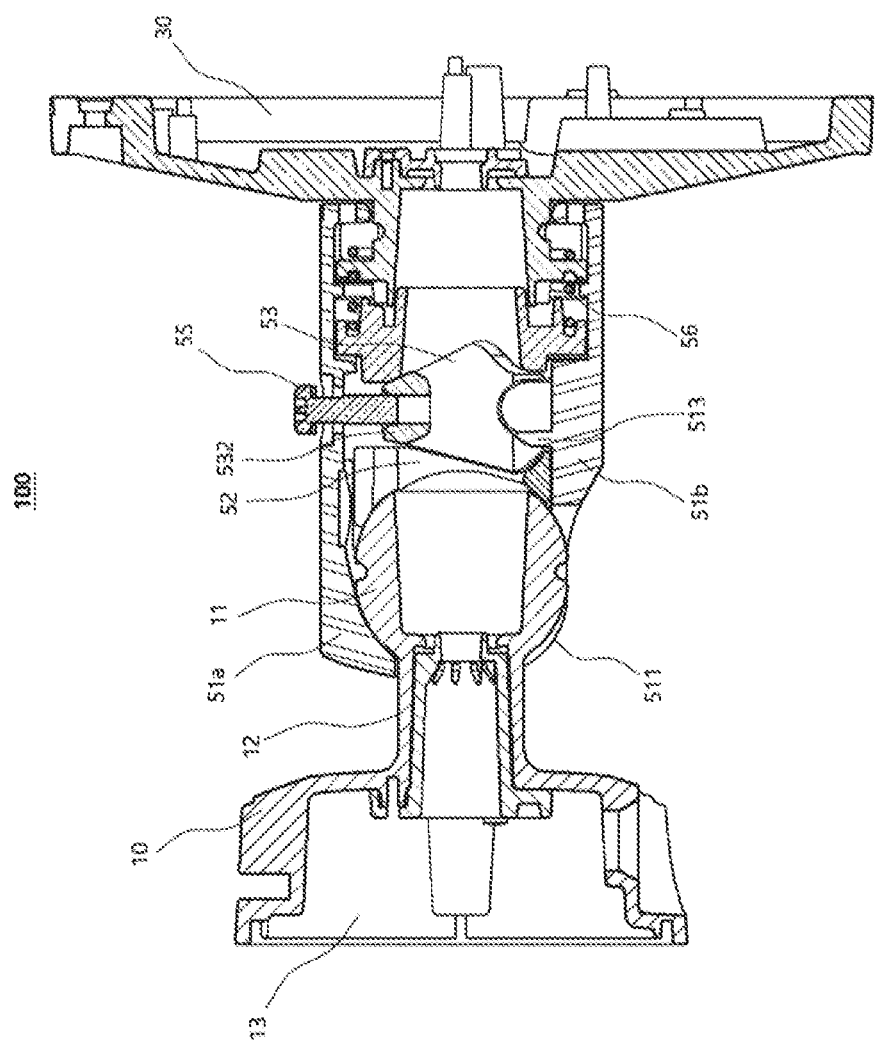
FIG. 5 is a longitudinal sectional view taken along direction C-C' of FIG. 2 when the electronics mounting assembly is in a movable state according to the embodiment of an disclosure.
Figure 6:
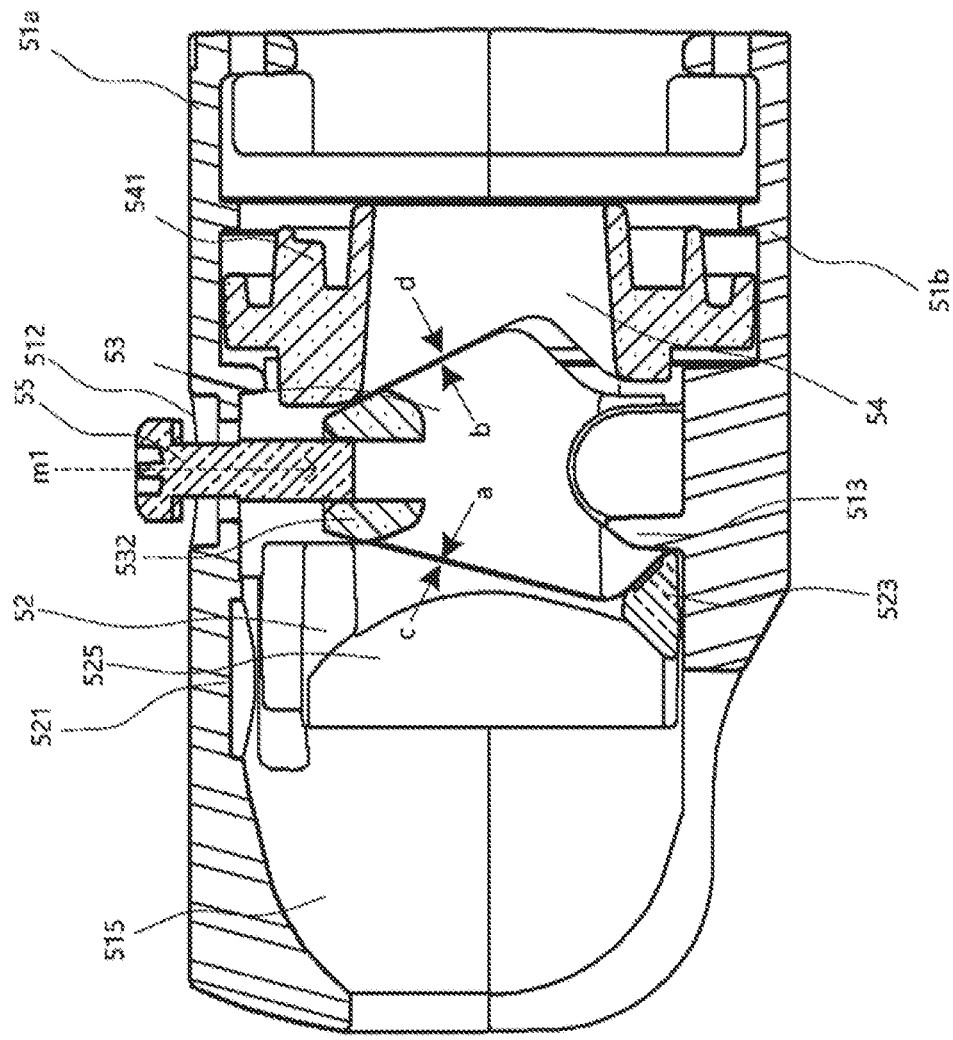
FIG. 6 is a longitudinal section obtained by removing a mounting support and a base from FIG. 5, according to an embodiment of the disclosure.
Figure 7:
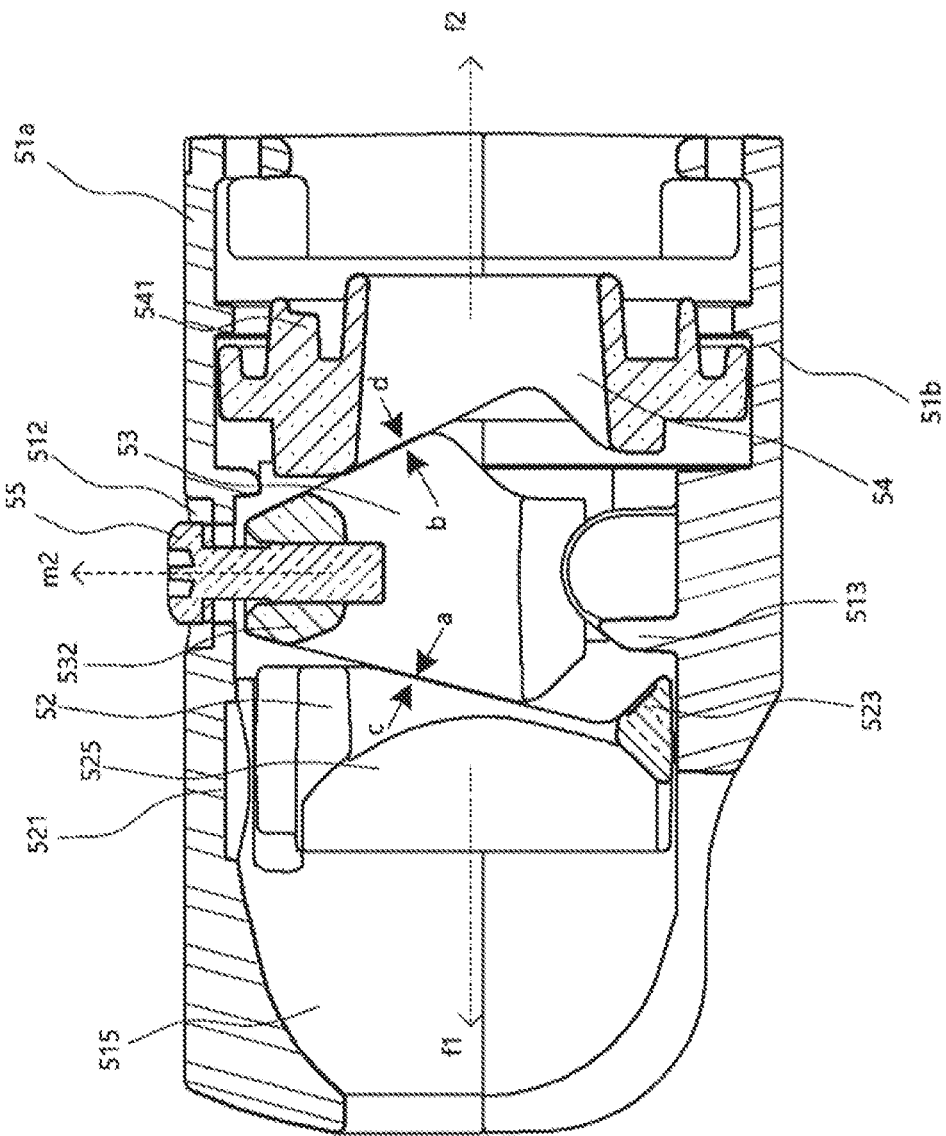
FIG. 7 is a longitudinal sectional view of the electronics mounting assembly of FIG. 6 when changed to a fixed state, according to an embodiment of an disclosure.

FIG. 5 is a longitudinal sectional view taken along direction C-C' of FIG. 2 when the electronics mounting assembly 100, according to the embodiment of the disclosure, is in the movable state. FIG. 6 is a longitudinal section obtained by removing the mounting support 10 and the base 30 from FIG. 5. FIG. 7 is a longitudinal sectional view of the electronics mounting assembly 100 of FIG. 6 when changed to the fixed state.

As described above, the arm 50 has the front locker 52 configured to be coupled to the ball joint 11 of the mounting support 10, the rear locker 54 configured to be coupled to the base 30, and the pusher 53 having the front inclined surface "a" (shown in FIG. 6) in contact with the front locker 52 and the rear inclined surface "b" (shown in FIG. 6) in contact with the rear locker 54.

In FIG. 6, the front inclined surface "a" is inclined closer to the mounting support 10 toward the bottom, and the rear inclined surface "b" is inclined closer to the base 30 toward the bottom. In addition, to correspond to this profile of the pusher 53, the front locker 52 has an inclined surface "c" corresponding to the front inclined surface "a," and the rear locker 54 has an inclined surface "d" corresponding to the rear inclined surface "b."

Since the front locker 52, the pusher 53, and the rear locker 54 are configured to contact each other through the inclined surfaces, an axial force acts simultaneously on the front locker 52 and the rear locker 54, or the action of the axial force is released as the pusher 53 ascends or descends.

As a way to elevate the pusher 53, a screw-nut method is used to convert rotation into rectilinear motion. When a screw and a nut are coupled while the rotational motion of the nut is restricted, the only nut moves linearly along the axial direction of the screw when the screw rotates.

In an embodiment, the screw fastening hole 512 is formed in a surface (e.g., an upper side) of the housing 51, and a tap member 532 is formed in the pusher 53 at a position close to the screw fastening hole 512. In an embodiment, the screw 55 is installed to screw the screw fastening hole 512 and the tab member 532 to each other.

Therefore, the pusher 53 descends ("m1," as shown in FIG. 6) when the screw 55 is rotated in a releasing direction and ascends ("m2," as shown in FIG. 7) when the screw 55 is rotated in a fastening direction.

When the pusher 53 descends (as in FIG. 6), the axial force between the front inclined surface "a" of the pusher 53 and the inclined surface "c" of the front locker 52 and between the rear inclined surface "b" of the pusher 53 and the inclined surface "d" of the rear locker 52 is released to bring about the movable state (Rx, Rz, Rz') in which the mounting support 10 and the base 30 can move with respect to the arm 50.

Here, the tilt motion Rx caused by the movement of the neck portion 12 of the mounting support 10 along the guide slot 511 and the rotational motion Rz caused by the rotation of the ball joint 11 about the axial direction Az of the arm 50 are allowed, and the rotational motion Rz' of the base 30 about the axial direction Az of the arm 50 is allowed.

Conversely, when the pusher 53 ascends (as in FIG. 7), the axial forces f1 and f2 act between the front inclined surface "a" of the pusher 53 and the inclined surface "c" of the front locker 52 and between the rear inclined surface "b" of the pusher 53 and the inclined surface "d" of the rear locker 52 to bring about the fixed state in which the mounting support 10 and the base 30 are fixed to the arm 50.

However, unlike the rear locker 52 having a rib directly coupled to the serration member 35, the ball joint 11 of the mounting support 10 may be kept fixed by friction. Therefore, if a coefficient of friction between the ball joint 11 and the first contact surface 515/the second contact surface 525 is low, there may be a problem that the installation direction of the electronic device 15 is changed after being installed.

Therefore, in order to prevent slippage and provide friction between the ball joint 11 (shown in FIG. 4) and the first contact surface 515/the second contact surface 525, according to an embodiment of the disclosure, a surface mesh is formed on a ball surface of the ball joint 11 by, for example, a knurling process. The knurling process is known as a process of forming horizontal or inclined grooves in the outer surface of tools or machinery to prevent slippage. The knurling process is more useful especially when the ball joint 11 is made of a metal material (e.g., aluminum).

In order to prevent slippage and provide friction between the ball joint 11 and the first contact surface 515/the second contact surface 525, according to another embodiment of the disclosure, an injection-molded product made of a non-metallic material may be coated or laid on the first contact surface 515 and the second contact surface 525. The non-metallic material refers to a non-metallic material with a high coefficient of friction, such as rubber, plastic, urethane, or resin. In addition, both the knurling process and the coating and laying of the injection-molded product on the ball joint 11 may also be applied together.

Figure 8:
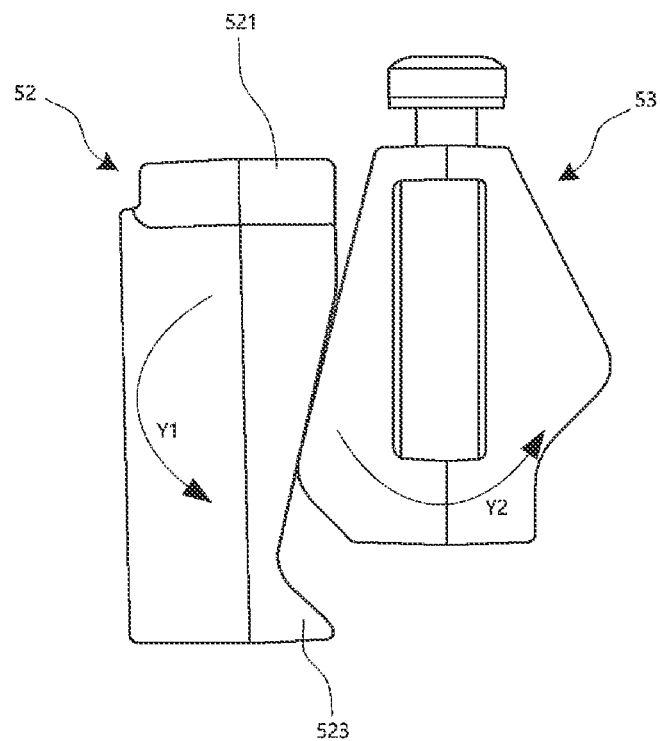
FIG. 8 illustrates a yawing phenomenon that may occur when an axial force is applied to a front locker as a pusher ascends, according to an embodiment of an disclosure.

FIG. 8 illustrates a yawing phenomenon that may occur when an axial force is applied to the front locker 52 as the pusher 53 ascends (as shown in FIG. 7).

According to the disclosure, although an axial force (that causes the front locker 52 to move forward) acts as the pusher 53 ascends, this is a process in which the vertical motion of the pusher 53 is changed to the horizontal motion of the front locker 52 by the inclined surfaces. Therefore, the pusher 53 and the front locker 52 have a yawing motion (Y1, Y2), together with a rectilinear motion. The yawing motion needs to be suppressed because it can cause problems such as wear/damage of component parts as well as inefficiency in power transmission.

In this regard, the front locker 52 includes a guider 521 (as shown in FIG. 4) coupled to a groove formed in the inner surface of the housing 51 to guide the movement of the front locker 52 in the axial direction Az of the arm 50. However, to prevent the yawing motion only with the guider 521, the guider 521 may be considerably long, which may be an obstacle to miniaturization of the apparatus.

Therefore, the disclosure proposes an additional yawing motion prevention structure together with the guider 521. According to an embodiment of the disclosure, the front locker 52 may further include a foot portion 523 formed at a position opposite the guider 521 to protrude toward the pusher 53. As a component corresponding to the foot portion 523, the housing 51 includes a stopper 513 protruding from the inner surface in an inner diameter direction.

Therefore, even when the front locker 52 is pushed forward by the ascent of the pusher 53, the foot portion 523 may touch the stopper 513 as illustrated in FIG. 6, thereby suppressing the front locker 52 from yawing downward.

Figure 9:
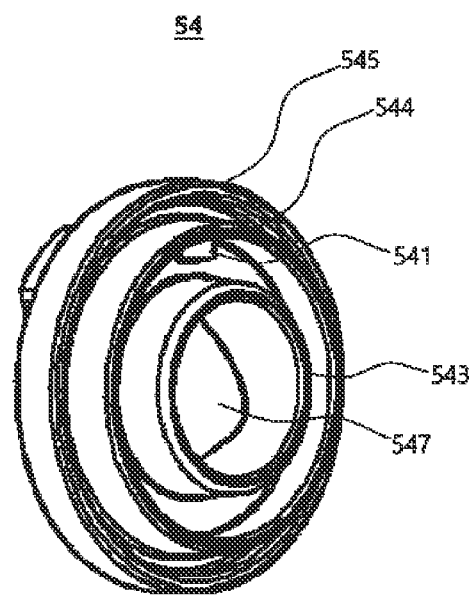
FIG. 9 is a rear perspective view of a rear locker, according to an embodiment of an disclosure.
Figure 10:
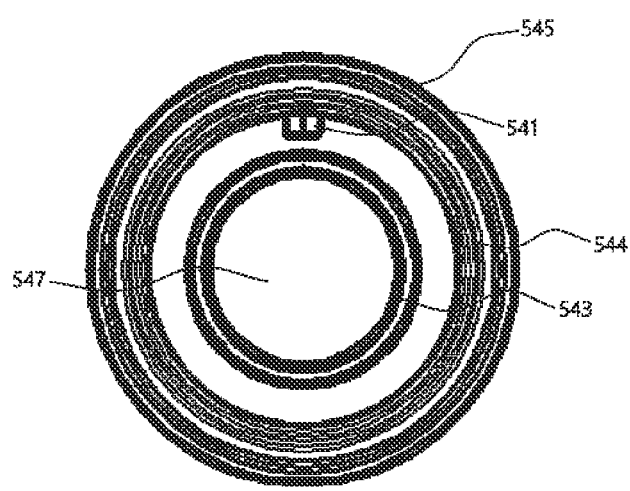
FIG. 10 is a rear view of the rear locker, according to an embodiment of an disclosure.

FIG. 9 is a rear perspective view of the rear locker 54. FIG. 10 is a rear view of the rear locker 54.

The rear locker 54 includes a rib 541 protruding from a rear surface of the rear locker 54 toward the serration member 35 so that rear locker 54 can be inserted between a plurality of teeth 36 of the serration member 35 formed in the base 30. In particular, the rib 541 has a tapered shape that becomes narrower in a direction in which the rib 541 protrudes. Therefore, even if the rib 541 is not in position between the teeth 36, the rib 541 can be easily seated between the teeth 36.

In one embodiment, a plurality of rim portions (a first rim portion 543, a second rim portion 544, and a third rim portion 545) are disposed concentrically on the rear surface of the rear locker 54. The first rim portion 543 is inserted into a through hole 37 (see FIG. 11) of the base 30. In one embodiment, the second rim portion 544 is concentrically disposed outside the first rim portion 543 and guides the rotation of the base 30 with respect to the arm 50 while surrounding the serration member 35 together with the first rim portion 543. In one embodiment, the third rim portion 545 is concentrically disposed outside the second rim portion 544 to form a space for accommodating an end of the spring 56 with the second rim portion 544.

Figure 11:
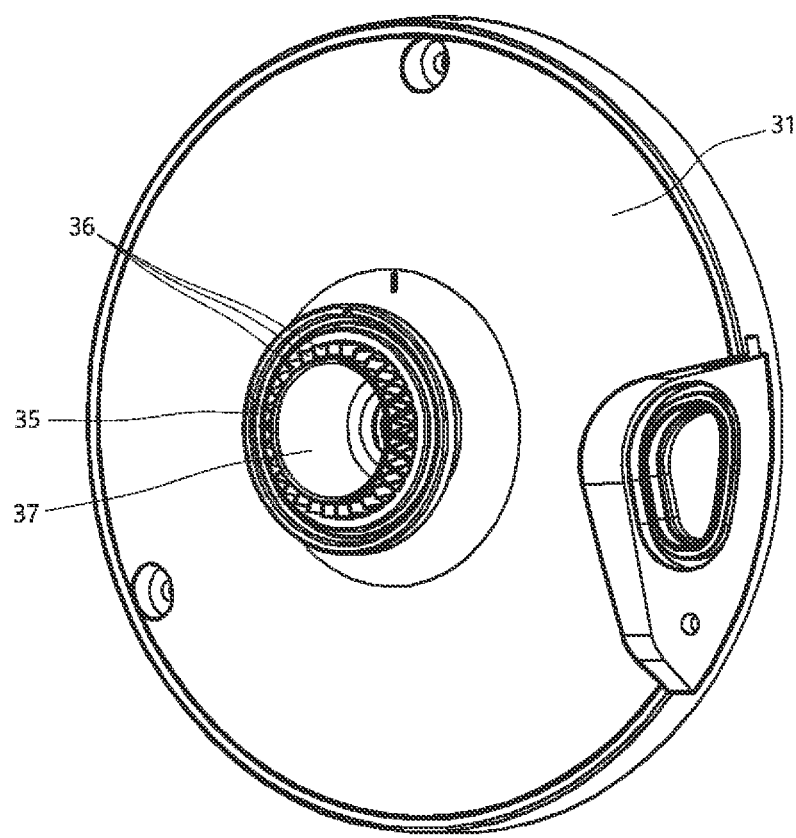
FIG. 11 is a front perspective view of the base, according to an embodiment of an disclosure.
Figure 12:
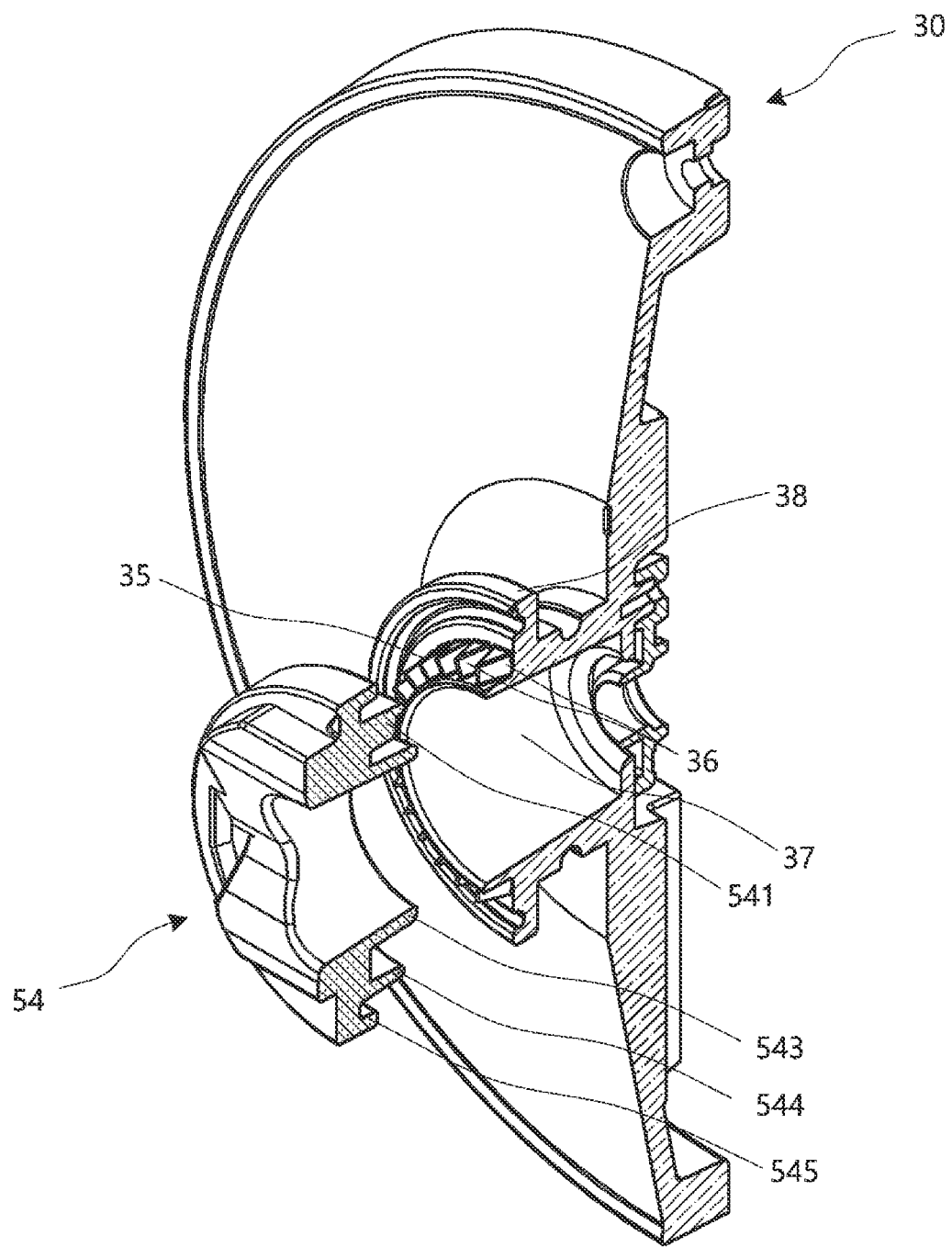
FIG. 12 is a longitudinal sectional perspective view illustrating the coupling relationship between the rear locker and the base, according to an embodiment of an disclosure.

FIG. 11 is a front perspective view of the base 30 coupled to the rear locker 54. FIG. 12 is a longitudinal sectional perspective view illustrating the coupling relationship between the rear locker 54 and the base 30.

The base 30 may include a flat member 31 installed on the fixed structure, a neck portion 33, and the serration member 35. The neck portion 33 extends forward from the flat member 31 and is held by a rear opening of the housing 51. In one embodiment, the serration member 35 has a plurality of teeth 36 disposed in a circumferential direction at the front of the neck portion 33. The through hole 37 is formed in the center of the serration member 35 to penetrate the base 30.

In order to easily place the rib 541 between the teeth 36, the rib 541 and the teeth 36 may be configured to have a tapered shape that becomes narrower in the direction in which the rib 541 and the teeth 36 protrude. In this configuration, a pitch interval between the teeth 36 may be reduced. Accordingly, when the arm 50 is rotated and positioned with respect to the base 30, the resolution can be improved. This is because the resolution increases as the pitch interval between the teeth 36 decreases or as the total number of teeth 36 (usually referred to as a module value) present in the circumferential direction increases.

In the above embodiments, the electronics mounting assembly 100 has been described as including the mounting support 10, the arm 20, and the base 30. However, an embodiment in which the mounting support 10 including the ball joint 11 is provided as an accessory to the electronic device 15, and the electronics mounting assembly 100 excluding the mounting support 10 can also be considered. In this case, the electronics mounting assembly includes a base installed on a fixed structure and an arm connecting the base to a mounting support, and the mounting support for mounting an electronic device may be coupled to the arm. Other operations of the disclosure are the same as those of the above-described embodiments, and thus a redundant description thereof is omitted.

Many modifications and other embodiments of the disclosure will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

What is claimed is:

1. An assembly for mounting an electronic device, the assembly comprising:
   a base;
   a mounting support; and
   an arm connecting the base and the mounting support,
   wherein the arm comprises:
      a front locker configured to be coupled to a joint of the mounting support;
      a rear locker configured to be coupled to the base;
      a pusher having a front inclined surface in contact with the front locker and a rear inclined surface in contact with the rear locker; and
      a housing accommodating the front locker, the rear locker, and the pusher,
   wherein the front inclined surface is inclined closer to the mounting support toward the bottom of the pusher and the rear inclined surface is inclined closer to the base toward the bottom of the pusher,
   wherein the front locker has a first inclined surface corresponding to the front inclined surface and the rear locker has a second inclined surface corresponding to the rear inclined surface,
   wherein the arm further comprises a spring interposed between the rear locker and the base, and
   wherein the spring is configured to provide an elastic force in a direction to separate the rear locker and the base.

2. The assembly of claim 1, wherein a screw fastening hole is formed in a surface of the housing,
   wherein a tap member is formed in the pusher at a position facing the screw fastening hole, and
   wherein the arm further comprises a screw for screwing the screw fastening hole and the tap member.

3. The assembly of claim 2, wherein the housing comprises an upper housing in which the screw fastening hole is formed and a lower housing assembled with the upper housing.

4. The assembly of claim 2, wherein the pusher is configured to descend based on the screw rotated in a releasing direction, and wherein the pusher is configured to ascend based on the screw rotated in a fastening direction.

5. The assembly of claim 3, wherein in a first case that the pusher descends, a first axial force between the front inclined surface of the pusher and the first inclined surface of the front locker and between the rear inclined surface of the pusher and the second inclined surface of the rear locker is released to bring about a movable state in which the mounting support and the base is movable with respect to the arm, and wherein in a second case that the pusher ascends, a second axial force acts between the front inclined surface of the pusher and the first inclined surface of the front locker and between the rear inclined surface of the pusher and the second inclined surface of the rear locker to bring about a fixed state in which the mounting support and the base are fixed to the arm.

6. The assembly of claim 5, wherein the mounting support comprises:
a ball joint surface contacting a first contact surface formed on an inner surface of the housing and a second contact surface formed on a portion of the front of the front locker;
a neck portion extending forward from a ball joint and being held by an opening of the housing; and
a mounting portion connected to the neck portion and configured to mount the electronic device.

7. The assembly of claim 6, wherein a surface mesh is formed on a ball surface of the ball joint by a knurling process.

8. The assembly of claim 6, wherein an injection-molded product made of a non-metallic material is coated and laid on the first contact surface and the second contact surface.

9. The assembly of claim 6, wherein a guide slot is formed on one side of the housing,
wherein, in the movable state, a movement of the neck portion of the mounting support along the guide slot causes a tilt motion of the mounting support, and a rotation of the ball joint about an axial direction of the arm causes a first rotational motion of the mounting support, and
wherein, in the movable state, the base has a second rotational motion about the axial direction of the arm.

10. The assembly of claim 9, wherein the front locker comprises a guider coupled to a groove formed in the inner surface of the housing and guiding the movement of the front locker in the axial direction of the arm.

11. The assembly of claim 10, wherein the front locker further comprises a foot portion formed at a position opposite the guider to protrude toward the pusher,
wherein the housing comprises a stopper formed on the inner surface to protrude in an inner diameter direction, and
wherein, in a case that the front locker is pushed forward by the pusher being ascending, the foot portion and the stopper touch each other to suppress the front locker from yawing downward.

12. The assembly of claim 1, wherein the base comprises:
a flat member;
a neck portion extending forward from the flat member and being held by an opening of the housing;
a serration member having a plurality of teeth disposed in a circumferential direction at the front of the neck portion; and
a through hole penetrating a center of the serration member.

13. The assembly of claim 12, wherein the rear locker comprises a rib protruding from a rear surface of the rear locker toward the serration member, and
wherein the rib is inserted between the plurality of teeth.

14. The assembly of claim 13, wherein both of the rib and the plurality of teeth have a tapered shape that becomes narrower in another direction in which the rib and the plurality of teeth protrude.

15. The assembly of claim 14, wherein a pitch interval between the plurality of teeth determines a resolution at which the base adjusts a position by rotating with respect to the arm.

16. The assembly of claim 14, wherein the rear surface of the rear locker comprises:
a first rim portion inserted into the through hole;
a second rim portion concentrically disposed outside the first rim portion and guiding a rotation of the base with respect to the arm while surrounding the serration member together with the first rim portion; and
a third rim portion concentrically disposed outside the second rim portion and forming a space for accommodating an end of the spring with the second rim portion.

17. The assembly of claim 1, wherein at least one of the joint, the front locker, the pusher, the rear locker, and the base have a through hole extending along an axial direction of the arm.

18. An assembly for mounting an electronic device, the assembly comprising:
a base;
a mounting support; and
an arm connecting the base and the mounting support,
wherein the arm comprises:
a front locker configured to be coupled to a joint of the mounting support;
a rear locker configured to be coupled to the base;
a pusher having a front inclined surface in contact with the front locker and a rear inclined surface in contact with the rear locker; and
a housing accommodating the front locker, the rear locker, and the pusher,
wherein the front inclined surface is inclined closer to the mounting support toward the bottom of the pusher and the rear inclined surface is inclined closer to the base toward the bottom of the pusher,
wherein the front locker has a first inclined surface corresponding to the front inclined surface and the rear locker has a second inclined surface corresponding to the rear inclined surface,
wherein in a first case that the pusher descends, an axial force between the front inclined surface of the pusher and the first inclined surface of the front locker and between the rear inclined surface of the pusher and the second inclined surface of the rear locker is released to bring about a movable state in which the mounting support and the base is movable with respect to the arm,
wherein in a second case that the pusher ascends, an axial force acts between the front inclined surface of the pusher and the first inclined surface of the front locker and between the rear inclined surface of the pusher and the second inclined surface of the rear locker to bring about a fixed state in which the mounting support and the base are fixed to the arm,
wherein the arm further comprises a spring interposed between the rear locker and the base, and wherein the spring is configured to provide an elastic force in a direction to separate the rear locker and the base.

* * * * *